July 22, 1941.　　　A. H. MAYNARD　　　2,250,027
CLUTCH AND BRAKE DEVICE
Filed Sept. 14, 1939　　　2 Sheets-Sheet 1

Inventor:
Arthur H. Maynard
By Armington and White
Attorneys.

July 22, 1941.   A. H. MAYNARD   2,250,027
CLUTCH AND BRAKE DEVICE
Filed Sept. 14, 1939   2 Sheets-Sheet 2

Inventor:
Arthur H. Maynard
By
Attorneys.

Patented July 22, 1941

2,250,027

UNITED STATES PATENT OFFICE 2,250,027

CLUTCH AND BRAKE DEVICE

Arthur H. Maynard, Warwick, R. I., assignor to Boston Wire Stitcher Company, Warwick, R. I., a corporation of Maine Application September 14, 1939, Serial No. 294,875

3 Claims. (Cl. 192—107)

The present invention relates to improvements in clutch- and brake-devices of the type illustrated and described in my United States Letters Patent No. 1,495,342 issued May 27, 1924.

The expansible clutch- and brake-elements illustrated and described in my prior patent are in the form of one-piece split rings. These rings are controlled by cams positioned between their free ends and operated to spread the ends apart to expand the rings into frictional engagement with cooperating annuli. Although such one-piece rings have been used extensively and are satisfactory with ordinary loads they do not expand in a true circle, thus causing uneven bearing pressure on the clutch or brake annulus. With heavy loads, as for instance in a stitching machine for driving wire staples through sheet-metal, the uneven bearing pressure on the clutch or brake annulus permits slippage resulting in excessive and uneven wear.

One of the objects of the present invention is to provide a clutch- or brake-device of the type indicated with an expansible element adapted to expand evenly throughout its length.

Another object of the invention is to provide an expansible element for a clutch- or brake-device comprising a plurality of articulated segments.

Another object of the invention is to provide a novel form of joint between the segments of the expansible element for hingedly connecting the segments to each other.

Still another object of the invention is to provide an expansible split ring of the type indicated which is adapted for economical manufacture and is efficient in performing its intended function.

Further objects of the invention are set forth in the following specification which describes a preferred form of construction of the improved device, by way of example, as illustrated by the accompanying drawings. In the drawings.

Figure 1:
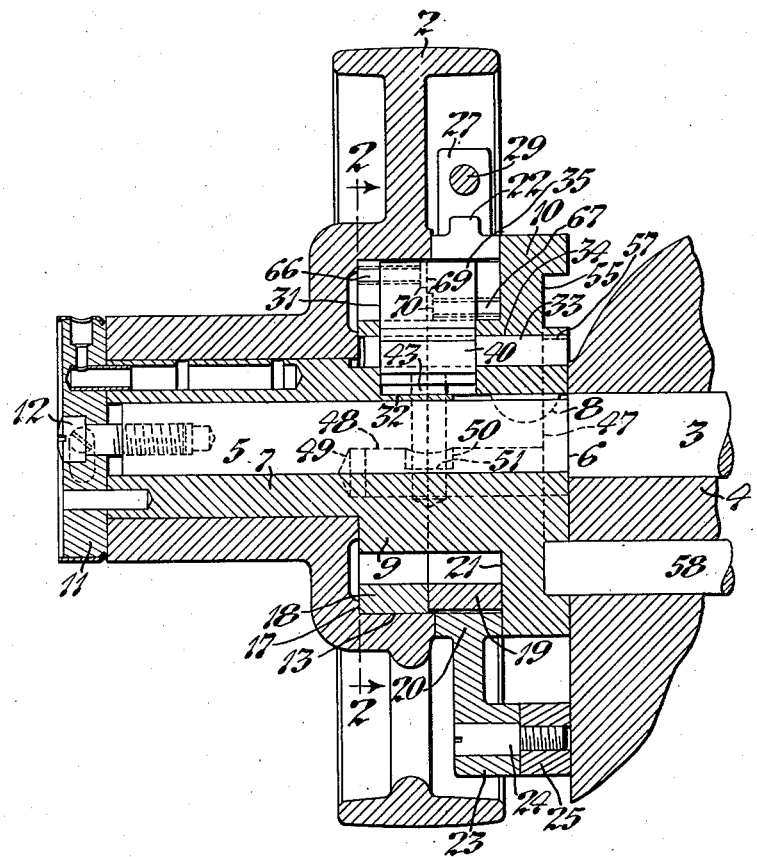
Fig. 1 is a longitudinal sectional view of a clutch- and brake-device incorporating the novel features of the present invention.

As before stated the clutch- and brake-device to which the present invention is applied is illustrated and described in my prior patent referred to above. This type of device is designed to control the stopping of the driven member at a predetermined point in its operation and, for this reason, is particularly adapted for use with such apparatus as wire-stitching or stapling machines, eyeletting machines, drop presses and the like. In this class of apparatus it is desirable to arrest operation of the reciprocating parts of the machine at a certain point in their stroke; for instance in stapling machines it is required to stop with the staple-driver raised above the work; and in a drop press it is preferable to stop the machine when the punch is in raised position above the die.

Suffice it to state herein that the brake- and clutch-device comprises a driving pulley 2 and a driven shaft 3. The shaft 3 is journaled in a bearing 4 constructed as a part of the frame of the machine and having an end portion 5 of reduced diameter which projects outwardly from the bearing portion with a shoulder 6 therebetween. Fitted onto the reduced portion 5 of the shaft 3 is an elongated sleeve 7 keyed thereto at 8 and arranged with its inner end abutting the shoulder 6 and the face of the bearing 4. The sleeve 7 is formed with an enlarged hub 9 provided with a disk or flange 10 which abuts the end of the bearing 4. The driving pulley 2 is mounted free to rotate on the sleeve 7 with its hub abutting the side of the hub 9 of the sleeve. The sleeve 7 and pulley 2 are held in position on the shaft 3 by means of a cap 11 secured to the end of the shaft by means of a screw 12.

At its inner or right-hand end, as viewed in Fig. 1, the hub of the pulley 2 is formed with a cup-shaped enlargement which is bored to provide an annular clutch-face 13 arranged concentric with the enlarged hub 9 of the sleeve 7. The clutch-face 13 is adapted to be frictionally engaged by an expansible split clutch-ring 18 constituting a feature of the present invention as later described in detail.

At the side of the clutch-ring 18 is a brake-ring 19 of the same construction, see Fig. 1, adapted to expand against the internal face of a brake-annulus 20 arranged between the side of the clutch-annulus 13 of the pulley 2 and the face 21 of the flange 10 on the clutch-sleeve 7. As illustrated in Fig. 1, the clutch-ring 18 and brake-ring 19 are held in place laterally between a shoulder 17 on the clutch-annulus and the face 21 of the flange 10 on the sleeve 7. As shown more particularly in Fig. 2, the brake-annulus 20 is preferably constructed in the form of a split ring having a stiffening rib or web 22 surrounding its periphery. The rib 22 is provided with a boss 23 through which a stud 24 projects for connecting the brake-annulus 20 to a link 25 which, in turn, is connected to the bearing 4 by means of a screw 26 to hold the brake-annulus from turning with the clutch-sleeve 7.

Figure 2:
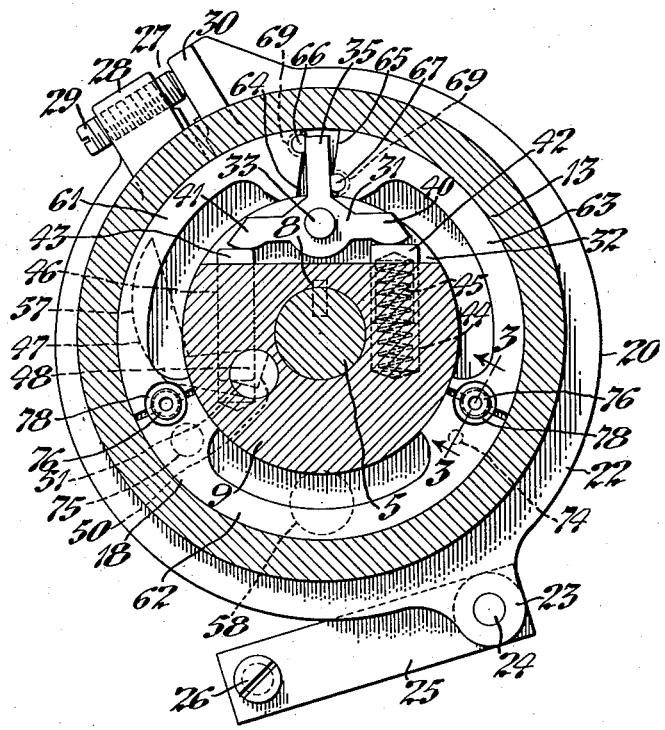
Fig. 2 is an enlarged transverse sectional view taken on line 2—2 of Fig. 1 showing the articulated construction of the expansible rings.

The brake-annulus 20 is split at 27, see Fig. 2, and formed at one side thereof with a lug 28 through which is threaded a stud 29. The end of the stud 29 bears against a lug 30 on the opposite side of the split 27 in the annulus and by turning the stud the split may be widened to expand the diameter of the annulus.

The clutch-ring 18 and brake-ring 19 are caused to expand and contract to alternately effect the clutching and braking action by means operated with a wedging effect between their split ends. For this purpose I employ a rockable lever 31 which is held in a slot 32 cut into the side of the hub 9 of the sleeve 7 and pivoted on a cross-pin 33 driven through a hole 34 in the hub. The lever 31 is of the double bell-crank type having a central arm 35 projecting into the space between the split ends of the clutch-ring 18 and brake-ring 19 and of sufficient width to extend across the ends of both rings, see Fig. 1.

The lever 31 has two opposite arms 40 and 41 adapted to be engaged by the ends of plunger-pins 42 and 43, respectively. The plunger 42 slides in a bore 44 in the hub 9 of the sleeve 7 and a spring 45 acting between the bottom of the bore and the plunger tends to force the latter against the arm 40 of the lever 31 to rock the latter in a counterclockwise direction as viewed in Fig. 2. The plunger 43 slides in a similar bore 46 with its end bearing against the arm 41 to rock the lever 31 in a clockwise direction, this plunger being actuated by means of a rockable pawl 47 next to be described.

The pawl 47 has a cylindrical hub or bearing stud 48 adapted to turn in a longitudinal bore 49 which intersects the bore 46 in the hub 9 of the sleeve 7. The hub of the stud 48 is formed with a cut 50 extending part way across its axis but leaving an upstanding ledge or abutment 51 at its end, see Fig. 2. The edge of the ledge or abutment 51 is adapted to ride across the end of the plunger 43 in the manner of a cam or eccentric whereby to force the plunger outwardly to rock the lever 31 against the action of the spring-pressed plunger 42. The hub or bearing stud 48 extends toward the right-hand face of the flange on the sleeve 7, as viewed in Fig. 1, and this face of the flange is scored with an annular groove 55 into which the stud projects. The pawl 47 has a tail-piece 57 which is positioned in a recessed portion of the groove 55 in the flange 10. The tail-piece 57 is subject to the influence of centrifugal force during rotation of the sleeve 7, thereby tending to rock the stud 48 in a counterclockwise direction as viewed in Fig. 2 to insure release of the brake-ring 19 and expansion of the clutch-ring 18 by the spring-pressed plunger 42.

The pawl 47 is rocked to project the plunger-pin 43 against the controlling lever 31 by means of a sliding stop-plunger or shift-rod 58. The plunger or rod 58 may be mounted to slide in a bore in the bearing 4, see Fig. 1, or it may be held in a separate bearing with its end adapted to enter the annular groove 55 in the flange 10 whereby to cause it to make contact with the side of the tail-piece 57 of the pawl 47 to rock the latter as it rotates with the sleeve 7. The plunger-rod 58 may be operated by a spring or weight upon the release of a detent, as is usual in various types of machine stop-motions, or it may be shifted manually through the medium of a hand- or foot-lever as is sometimes employed for the purpose.

In accordance with the present invention the expansible clutch- and brake-rings 18 and 19 each comprises a plurality of articulated segments having arcuate peripheries. As illustrated in the present drawings, each of the rings 18 or 19 has three segments 61, 62 and 63 but it will be understood that the rings may comprise a greater number of segments if desired. The end segments 61 and 63 of each ring 18 and 19 have adjacent terminal faces 64 and 65 which extend parallel to each other but are angularly related to a plane radial to the arcuate periphery of the segments. Hardened pins 66 and 67 are mounted in slots in the end faces 64 and 65, being positioned in offset relationship, one adjacent the inner periphery and the other adjacent the outer periphery of the ring, and have flattened sides which bear against the sides of the arm 35 of the controlling lever 31. The pins 66 and 67 are formed with heads 69 seated in counterbores 70 in the ends of the rings 18 and 19 to prevent their displacement in one direction, and the opposed faces of the rings abut the ends of the pins to hold their heads in the counterbores. The opposite ends of the segments 61 and 63 have arcuate bearing surfaces 71, see Fig. 4, extending less than 180 degrees with countersunk recesses 72 at opposite sides surrounding the bearing surfaces. As will be noted by reference to Figs. 3 and 4, the bottom of the recesses 72 are beveled or of conical form to provide a raised annular rib 73 adjacent the bearing surfaces 71.

The intermediate segment 62 is similar in form to the segments 61 and 63 but with arcuate bearing surfaces 71 and countersunk recesses 72 at both of its ends. At the side of the segment 62 is a projecting pin 74 positioned adjacent one end and a hole 75 is provided adjacent the opposite end for receiving the corresponding pin of the opposite ring. The purpose of these pins is to insure the proper relationship of the rings 18 and 19 in assembling them with the other parts of the device.

Figures 3, 4:
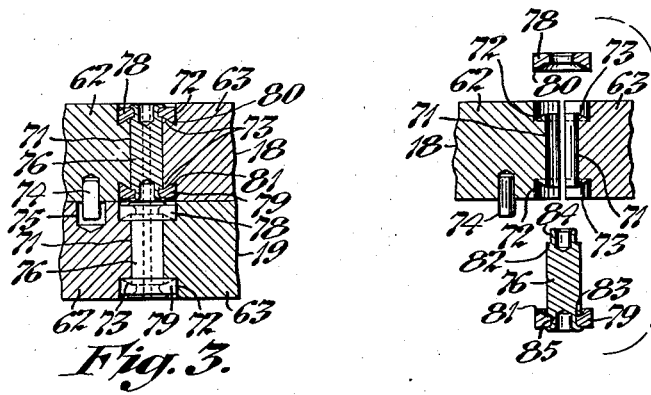
Fig. 3 is a further enlarged sectional view taken on line 3—3 of Fig. 2 showing the construction of the hinge-joints for connecting adjacent segments of the expansible rings.
Fig. 4 is a sectional view through one of the articulated joints showing the parts in disassembled extended relationship.

The adjacent ends of the segments 61, 62 and 63 of each ring 18 and 19 are connected by hinge-pins 76 of a diameter to closely fit the arcuate bearing surfaces 71. Heads 78 and 79 are provided at the opposite ends of the pins 76 which loosely fit into the countersunk recesses 72, the heads having projecting peripheral flanges 80 and 81 which interlock with the annular ribs 73 on the segments to hold them connected. As illustrated in Fig. 4 the heads 78 and 79 are seated on shoulders 82 and 83 adjacent the ends of the pins 76 and attached thereto by riveting the reduced ends 84 and 85 of the pins over the outer faces of the heads. Thus the pins 76 hingedly connect the plurality of segments to form a ring and act to oppose the end thrust between the segment when the ring is expanded. It will be understood that the clutch-ring 18 is reversed with respect to the brake-ring 19 with the slots between the split ends of the rings extending in opposite angular relationship with respect to a plane radial to the ring so that the arm 35 of the lever 31 acts simultaneously to expand one ring and release the other upon rocking movement of the lever. One embodiment of the invention having now been described in detail the mode of operation of the clutch- and brake-device is explained as follows.

With the parts of the clutch- and brake-device in the relationship illustrated in Fig. 1 the plunger or shift-rod 58 is withdrawn manually to start the operation of the machine to which the device is applied. Upon release of the shift-rod 58 the spring-pressed plunger 42, acting against the arm 40 of the controlling lever 31, rocks the latter in a counterclockwise direction as viewed in Fig. 2. Due to the angular relationship of the parallel end faces 64 and 65 of the clutch ring 18 which bear against the arm 35 of the controlling lever 31 the rocking movement of the latter causes the ends of the ring to be spread apart and thereby expands the ring to frictionally engage it with the clutch annulus 13. Due to the articulated construction of the ring 18 each segment 61, 62 and 63 moves substantially radially into frictional engagement with the cooperating annulus 13 when the ring is expanded and applies an even bearing pressure around its entire periphery. The end thrust caused by expanding the ring 18 is opposed by the pivot pins 76 between adjacent segments 61, 62 and 63 which also permit relative movement to adapt the segments to expand radially. Simultaneously with the expansion of the clutch-ring 18 the central arm of the controlling lever 31 is moved toward parallel relationship with respect to the end faces 64 and 65 of the brake-ring to release the latter.

Upon engagement of the clutch-ring 18 with the clutch-annulus 13 and the release of the brake-ring 19 the sleeve 7 and driven shaft 3 keyed thereto will rotate with the driving pulley 2 as a unit. During the rotation of the sleeve 7 the tail-piece 57 of the pawl 47 tends to swing outwardly under the action of centrifugal force to insure the engagement of the clutch-ring 18 and release of the brake-ring 19. When the sleeve 7 and flange 10 have completed one revolution the pawl 47 engages the plunger or shift-rod 58. Thus, the tail-piece 57 of the pawl 47 is caused to move inwardly toward the axis of the shaft 3 to thereby rock the hub 48. Rocking movement of the hub 48 of the pawl 57 causes its ledge or abutment 51 to engage and actuate the plunger 43 which, in turn, rocks the lever 31 against the action of the spring-pressed plunger 42 to cause the arm 35 of the lever to move in a clockwise direction as viewed in Fig. 2. Thus, the clutch-ring 18 is released and the ends of the brake-ring 19 are spread apart to expand the latter to frictionally engage the brake annulus 20 to quickly stop the shaft 3 in its initial position. It will be understood that the plunger or shifting rod 58 may be withdrawn and released at will to drive the machine intermittently or it may be held in a withdrawn position so that the machine will operate continuously.

It will be observed from the foregoing that the present invention provides a clutch- and brake-device having expansible rings comprising articulated segments adapted to move radially to apply an even bearing pressure on a cooperating annulus throughout its entire periphery. It will also be observed that a novel form of articulate joint has been provided for connecting the adjacent segments of the rings.

While the present invention is herein described and illustrated as applied to a preferred form of device, it is to be understood that various modifications made in the character of the device to which the expansible rings are applied and in the construction and arrangement of the parts of the ring. Therefore, without limiting myself in this respect, I claim:

1. An expansible clutch- or brake-ring comprising a plurality of articulated segments, the adjacent ends of two of the segments being spaced apart to provide a slot therebetween and the other adjacent ends having arcuate bearing surfaces with recessed grooves on the sides of the segments surrounding the bearing surfaces, and bearing pins between the bearing surfaces at the ends of the segments and having heads with peripheral flanges projecting into the recessed grooves for maintaining the segments connected to each other.

2. An expansible clutch- or brake-ring comprising a plurality of articulated segments, the adjacent ends of two of the segments being spaced apart to provide a slot therebetween and the other adjacent ends having arcuate bearing surfaces with countersunk grooves on the sides of the segments surrounding the bearing surfaces, the bottom of said countersunk grooves being recessed to provide annular ribs, and bearing pins positioned between the bearing surfaces at the ends of the segments and having heads at their opposite ends with peripheral flanges projecting into the recessed bottoms of the grooves and interlocking with the annular ribs to connect the segments to each other.

3. An expansible clutch- or brake-ring comprising a plurality of articulated segments, the adjacent ends of two of the segments being spaced apart to provide a slot therebetween and the other adjacent ends having arcuate bearing surfaces, bearing pins arranged between the arcuate bearing surfaces at the ends of the segments and having heads at their opposite ends overlying the sides of the segments adjacent said bearing surfaces, and interlocking means on the heads of the pins and the sides of the segments for holding the segments connected to provide a unitary split ring.

ARTHUR H. MAYNARD.